US012554690B2

(12) United States Patent
Creath et al.

(10) Patent No.: US 12,554,690 B2
(45) Date of Patent: *Feb. 17, 2026

(54) SERVICE CHAIN FOR COMPLEX CONFIGURATION-DRIVEN DATA QUALITY RATIONALIZATION AND DATA CONTROL (71) Applicant: Capital One Services, LLC, McLean, VA (US)

(72) Inventors: Lance Creath, Chicago, IL (US); Jason Kabel, Palmyra, VA (US); Ming Yuan, Buffalo Grove, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,993

(22) Filed: Jun. 17, 2024

(65) Prior Publication Data

US 2024/0338350 A1 Oct. 10, 2024

Related U.S. Application Data (63) Continuation of application No. 18/047,812, filed on Oct. 19, 2022, now Pat. No. 12,045,216.

(51) Int. Cl.
G06F 17/00 (2019.01)
G06F 16/215 (2019.01)

(52) U.S. Cl.
CPC ................ G06F 16/215 (2019.01)

(58) Field of Classification Search
CPC .................................................. G06F 16/215
See application file for complete search history.

(56) References Cited

U.S. PATENT DOCUMENTS

| | | | |
|---|---|---|---|
| 9,576,036 B2* | 2/2017 | Li | G06F 16/254 |
| 10,776,740 B2 | 9/2020 | Halberstadt et al. | |
| 10,896,352 B2 | 1/2021 | Hsieh et al. | |
| 11,138,279 B1 | 10/2021 | White et al. | |
| 11,416,456 B2* | 8/2022 | Staeben | G06F 16/254 |
| 12,045,216 B2* | 7/2024 | Creath | G06F 16/215 |
| 2020/0026710 A1 | 1/2020 | Przada et al. | |
| 2021/0326334 A1 | 10/2021 | Shrivastava et al. | |
| 2022/0091768 A1 | 3/2022 | Miller et al. | |

OTHER PUBLICATIONS

Noriko Hanakawa et al. "A Computer System Quality metric for Infrastructure with Configuration Files' Changes" In Proceedings of the 2nd International Conference on Software Engineering and Information Management. Asso. for Computing Machinery, 39-43, https://doi.org/10.1145/3305160.3305168, Jan. 2019.

* cited by examiner

Primary Examiner — Greta L Robinson
(74) Attorney, Agent, or Firm — Banner & Witcoff, Ltd.

(57) ABSTRACT

Techniques for data quality analysis may include the determination of data quality metrics using reconfigurable quality components. Access to the data may be based on the determined quality metrics. The configurable quality components may determine quality metrics for corresponding datasets. The quality components may be configured automatically based on quality configurations. The configuration of the quality components may be facilitated using a data orchestrator.

20 Claims, 5 Drawing Sheets

SERVICE CHAIN FOR COMPLEX CONFIGURATION-DRIVEN DATA QUALITY RATIONALIZATION AND DATA CONTROL

CROSS REFERENCE TO RELATED APPLICATIONS

This patent application is a continuation patent application of U.S. patent application Ser. No. 18/047,812, filed Oct. 19, 2022, which is incorporated herein by reference in its entirety.

FIELD OF USE

Aspects of the disclosure relate generally to data quality analysis and more specifically to the determination of data quality metrics and control of data access based on the determined quality metrics.

BACKGROUND

Data analytics technologies may be limited in both breadth and scale, unilaterally focused and siphoned from others. These solutions lack actionability and accountability given their limited focus, such as being limited for audit or verification purposes of a found defect. Such solutions also lack the ability to determine details of data defects, such as where data defects happened or the responsibility for fixing the defect that may impact downstream consumers.

Aspects described herein may address these and other problems, and generally improve the quality, efficiency, and speed of data quality measures, the identification and communication of data quality issues, and the control of data flow based on quality measures and configurations.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects of the present disclosure provide comprehensive data quality measures that are scalable in both onboarding and computing, while providing the benefit of identification and communication of data quality issues, and the control of data flow based on quality measures and configurations. This advantageously provides accountability enforcement and acknowledgement of the quality of data before use by the client.

According to some aspects of the disclosure, configurable quality components (quality gates) are provided to determine corresponding quality metrics for the analysis of datasets across multiple dimensions. These aspects provide the benefit of the consolidation of multiple data quality technologies covering multiple dimensions into a single-entry point implementation. This advantageously reduces the time and complexity of implementing multiple single-data-quality systems that have limited dimensionality, while allowing data owners/producers to dynamically reconfigure the quality components based on the resulting data metrics.

Conventional technologies lack transparency of data quality issues and their causes, which often results in the consumers of data being unaware of upstream data quality issues until the data is consumed downstream. Aspects of the present disclosure provide the benefit of real-time quality metrics of data to allow consumers to make consumption decisions based on the quality metrics in real-time before the data is consumed, as well as may provide quality configurations and data flow control and usage leveraging the increased data transparency. These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for data quality analytics and more specifically to the determination of data quality metrics using reconfigurable quality components (gates) and the control of data access based on the determined quality metrics. Conventionally, data analysis technologies are limited in both breadth and scale, unilaterally focused and siphoned from others. These solutions lack actionability and accountability given their limited focus, such as being limited for audit or verification purposes of a found defect. Conventional technologies also lack the ability to determine data defects prior to data consumption as well as the details of the data defects, such as where the data defects happened or the party that is responsible for addressing the data defect.

Systems as described herein may include data quality measures using configurable quality components (quality gates). The quality components may determine quality metrics for corresponding datasets for the analysis of the datasets across multiple dimensions. The configurable quality components provide the benefit of the consolidation of multiple data quality technologies covering multiple dimensions into a single-entry point implementation. This advantageously reduces the time and complexity of implementing multiple single-data-quality systems that have limited dimensionality, while allowing data owners/producers to dynamically reconfigure the quality components based on the resulting data metrics.

The systems according to the disclosure may include data quality measures that are scalable in both onboarding and computing, and configured to identify and communicate data quality issues. The flow of data may be controlled based on quality measures and configurations, which advantageously provides accountability enforcement and acknowledgement of the quality of data before use by the client.

Conventional technologies lack transparency of data quality issues and their causes, which often results in the consumers of data being unaware of upstream data quality issues until the data is consumed downstream. Aspects of the present disclosure provide the benefit of real-time quality metrics of data to allow consumers to make consumption decisions based on the quality metrics in real-time before the data is consumed, as well as may provide quality configurations and data flow control and usage leveraging the increased data transparency.

Expanding and improving on the conventional technologies that are limited in both scope and transparency of data quality analyses, aspects of the present disclosure provide systems and methods that include configurable quality components (gates) that are configured to determine quality metrics for corresponding datasets based on quality configurations used to configure the quality components.

The quality components can be automatically configured, based on the quality configurations, to modify the configuration of the quality components to improve the data quality analysis. The modifications can include the aggregation of two or more quality configurations together, where the aggregated output of the quality components is then used to determine the quality metric for the corresponding dataset. The aggregation of quality components may include the chaining of two or more quality components together. The automatic configuration of the quality components, including the chaining of multiple components together, changes and improves the operation of computing devices, including the operation of determining quality metrics.

The system and method according to an aspect of the disclosure provides an additional improvement to the functioning of the computing device by implementing a "self-healing" configuration of the quality components. According to an aspect of the disclosure, the computing device may be configured to use a machine learning algorithm to automatically update the quality configurations based on an analysis of the generated quality metrics. In this example, the machine learning algorithm may be configured to update the quality configurations based on the analyses to update the resulting quality configurations. The machine learning algorithm may be trained based on analyses of the quality metrics with respect to one or more quality thresholds, and/or other feedback corresponding to the determined quality metrics. The "self-healing" operation may additionally or alternatively be performed based on feedback from an operator, such as the data owner.

Figure 1:
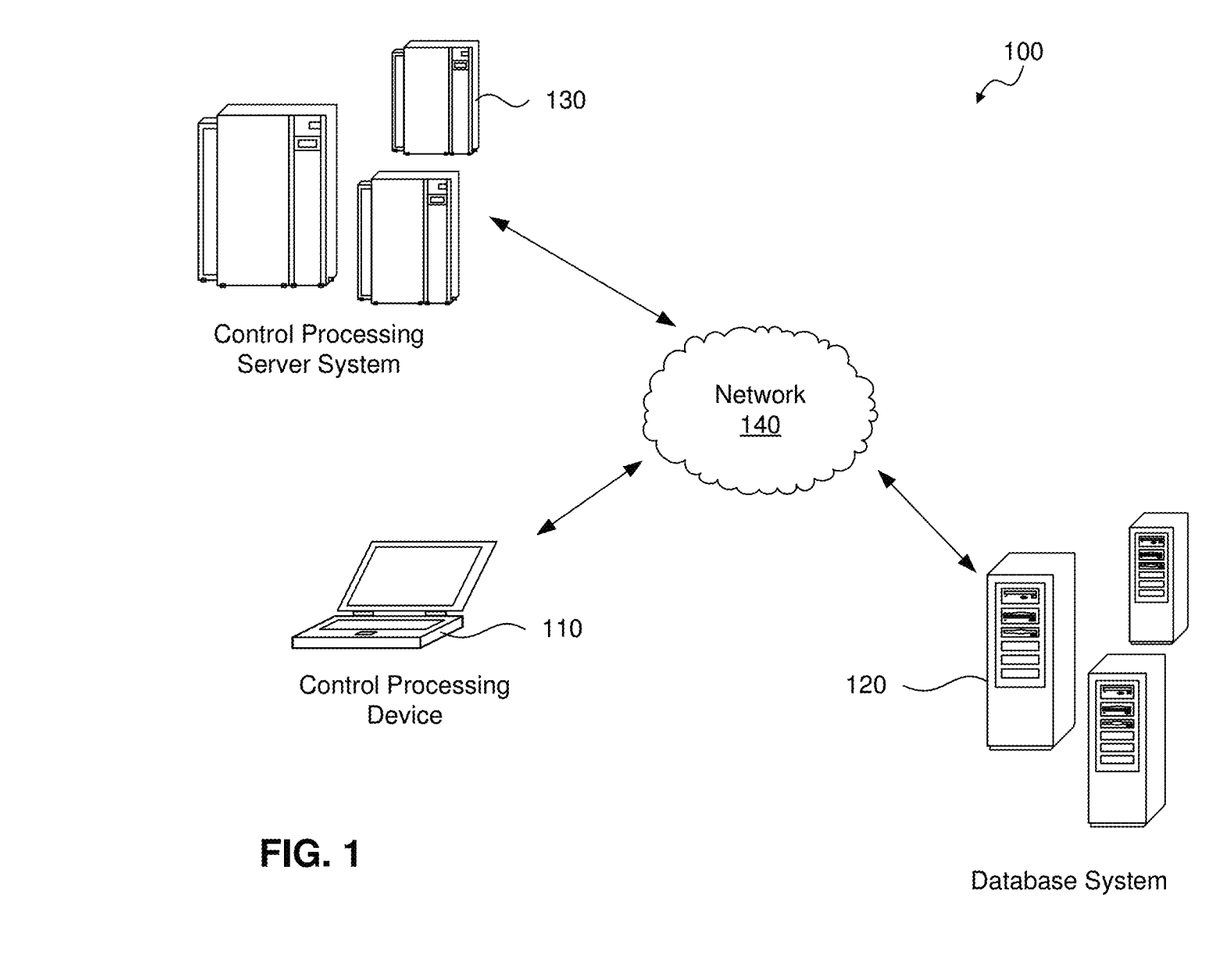
FIG. 1 shows an example of a control processing system in which one or more aspects described herein may be implemented.

FIG. 1 shows a system 100. The system 100 may include at least one device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Figure 2:
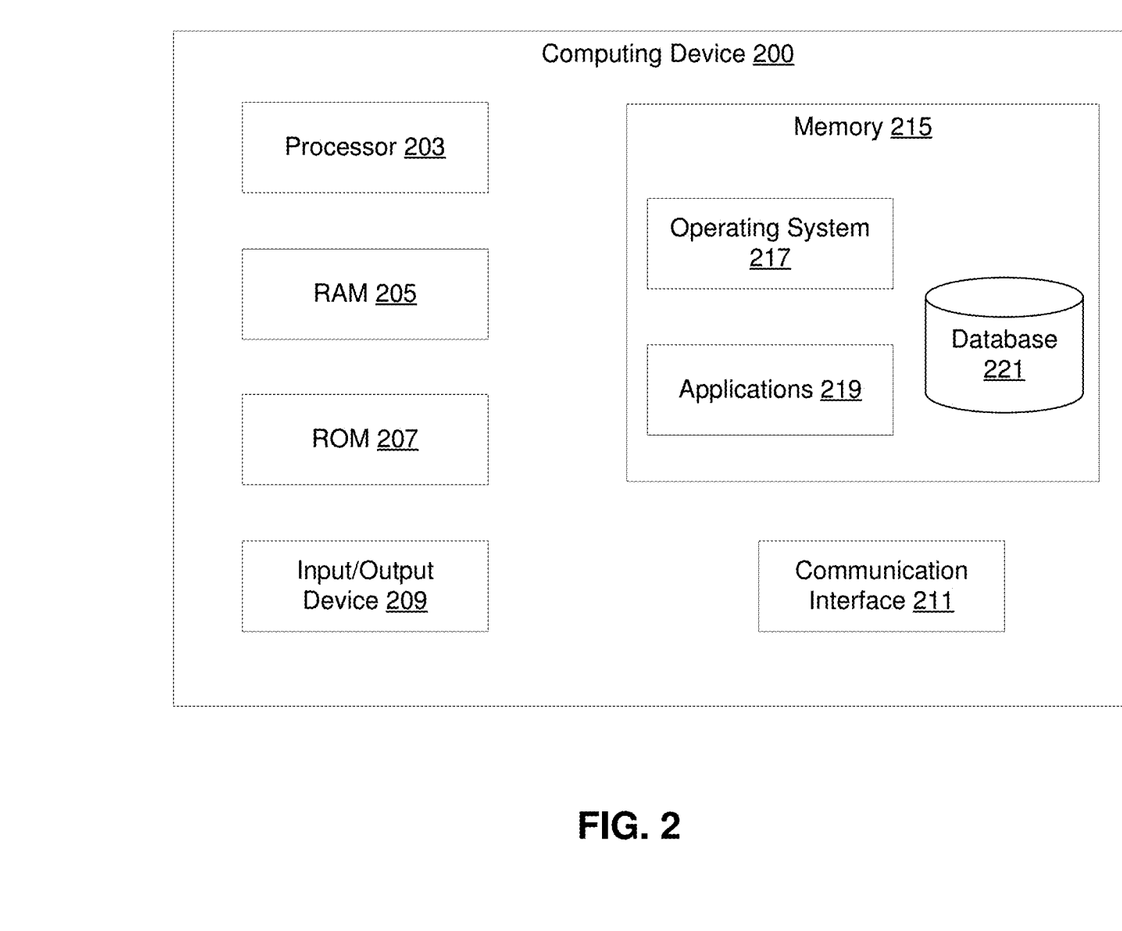
FIG. 2 shows an example computing device in accordance with one or more aspects described herein.

Devices 110 may perform client-side actions as described herein. Database systems 120 may perform data retrieval and storage actions as described herein, such as the retrieval and storage of datasets, quality metrics, quality configurations, or other information. Databases may include, but are not limited to relational databases, hierarchical databases, distributed databases, in-memory databases, flat file databases, XML databases, NoSQL databases, graph databases, and/or a combination thereof. Server systems 130 may perform server-side actions as described herein, such as the data retrieval and storage actions, and/or data quality determinations, including the configuration of quality components based on quality configurations to determine quality metrics as illustrated in FIG. 2. The server system 130 may be configured as a cloud-computing environment configured to perform the processes described herein. The network 140 may include a local area network (LAN), a wide area network (WAN), a wireless telecommunications network, and/or any other communication network or combination thereof. Although aspects may be described with the server system 130 performing the data quality determinations, such processing may be additionally or alternatively performed by the database system 120 and/or device 110. In some aspects, the processing involved in the data quality determinations may be distributed across two or more of the device 110, the system 120, and the system 130.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Turning now to FIG. 2, a computing device 200 that may be used with one or more of the computational systems is described. The computing device 200 may include a processor 203 for controlling overall operation of the computing device 200 and its associated components, including random access memory (RAM) 205, read-only memory (ROM) 207, input/output (I/O) device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer; a computer server; a mobile device, such as a laptop computer, a tablet computer, a smart phone, any other types of mobile computing devices and the like; and/or any other type of data processing device.

I/O device 209 may include a microphone, keypad, touch screen, and/or stylus through which a user of the computing device 200 may provide input, and may also include one or more of: a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to: RAM 205, ROM 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired and/or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. The processor 203 may additionally or alternatively include one or more microprocessors, digital signal processors (DSPs), application-specific instruction set processors (ASIPs), graphics and/or image processors, or other hardware processors as would be understood by one of ordinary skill in the art.

Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data. Although various components of computing device 200 are described separately, functionality of the various components may be combined and/or performed by a single component and/or multiple computing devices in communication without departing from the invention.

Figure 3:
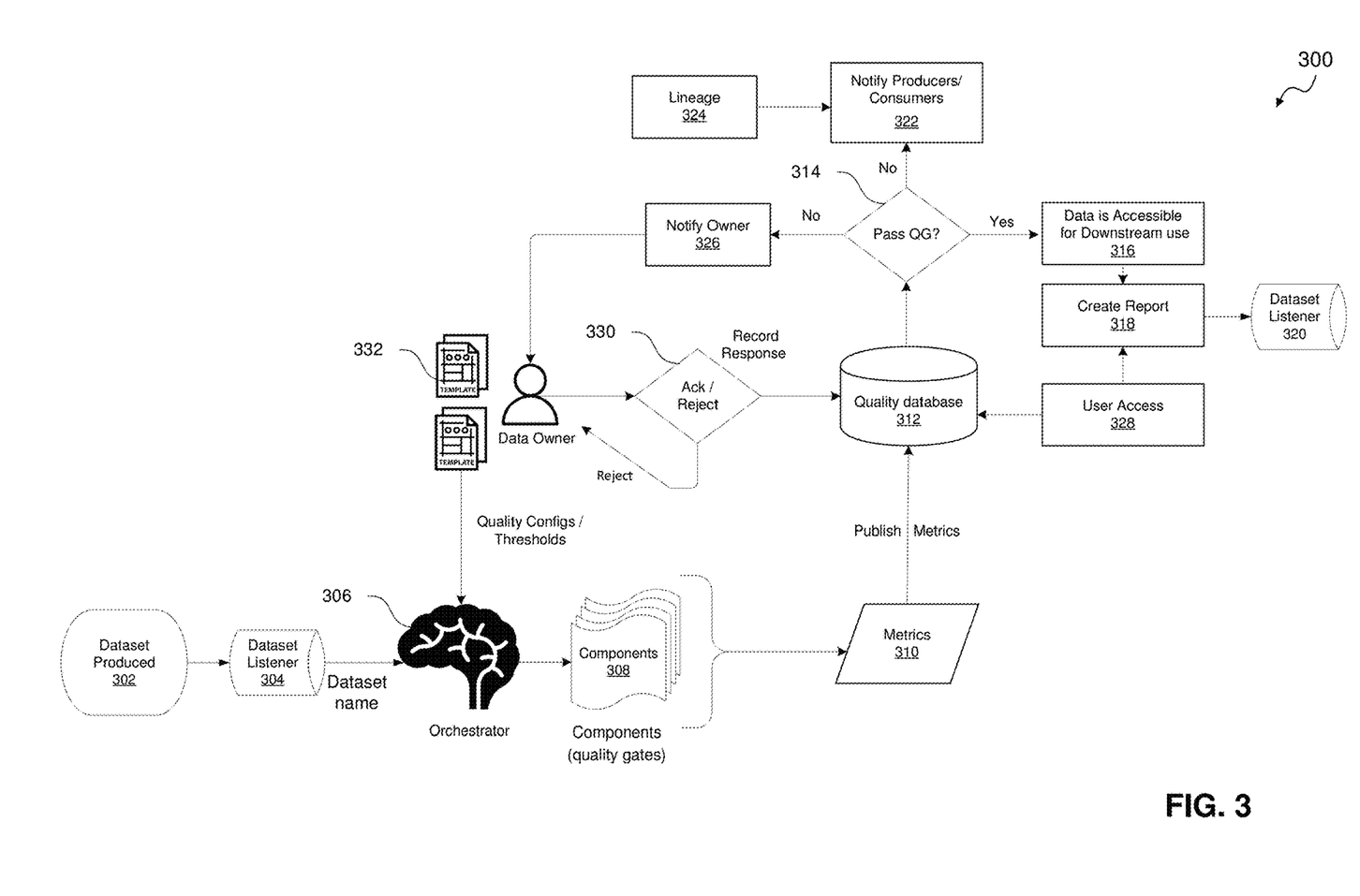
FIG. 3 shows a flow chart of a process for determining data quality according to one or more aspects of the disclosure.

Quality metrics defining a data quality may be determined based on configurable quality components that are configured using an orchestrator according to aspects of the disclosure. The orchestrator may adaptively configure the quality components based on the quality configurations. The quality metrics may then be used to control access to the corresponding dataset(s) associated with the quality metric(s). FIG. 3 shows a flow chart of a process for determining data quality according to one or more aspects of the disclosure. Some or all of the operations of process 300 may be performed using one or more computing devices as described herein. For the case of discussion, the reference number associated with a particular operation of the process 300 may also be used to reference a respective element/component of the computing device configured to perform the corresponding functional operation(s).

The process begins at operation 302 where a dataset may be produced or otherwise provided as an input to the system. The dataset may be stored in, for example, database system 120 and provided to the processing device 110 and/or processing server system 130. The received dataset may be stored in quality database 312 (e.g. embodied as database 221) and/or in other memory location(s) of memory 215. At operation 304, a dataset listener may receive the dataset. The dataset listener may be configured to listen for datasets and/or process the received dataset(s), including providing the received dataset with a corresponding dataset name.

At operation 306, an orchestrator may receive the dataset from the dataset listener and/or perform data orchestration processing on the received dataset(s). The data orchestration processing operations may include combining/aggregating data, segmenting data, and/or other data processing operations. In an exemplary embodiment, the orchestrator may be configured to automatically configure one or more quality components (gates) (operation 308) based on one or more quality configuration(s) (operation 332). The orchestrator may be embodied in processor 203.

The quality configurations may be provided by, for example, the data owner (or other operator of the system) at operation 332. The quality configurations 332 may include a set of parameters that may include, for example, one or more quality thresholds, accept/reject criteria, data locations, configurations (via json, yaml, etc.), or other parameters. The parameters may define a quality profile that may be realized as metadata.

In an exemplary embodiment, the accept/reject criteria may define the parameters in which the quality component (gate) determines whether the input dataset passes the respective quality component (gate) 308, and may be based on the unique data processing of the quality component. A threshold may be configured to the value outputs of a singular quality component or an aggregation of values for two or more quality components 308. According to aspects of the disclosure, the quality components 308 may be referred to as "quality gates" because the quality components may be considered "passed" or "failed" based on whether the data quality of the dataset input to the corresponding quality component passes or fails the particular quality schema defined by the quality configuration 332 of the quality component 308. The quality component(s) 308 may include one or more built-in plugins configured to allow the quality component 308 to meet the contract of the quality metadata schema, which allows the respective quality component to write quality metric(s) 310 to the quality database 312.

In an exemplary embodiment, the quality configurations may be determined and/or adjusted using a machine learning (ML) model. The machine learning model may support a generative adversarial network, a bidirectional generative adversarial network, an adversarial autoencoder, or an equivalent thereof. Additionally, or alternatively, the machine learning model may be a convolutional neural network, a recurrent neural network, a recursive neural network, a long short-term memory (LSTM), a gated recurrent unit (GRU), an unsupervised pretrained network, a space invariant artificial neural network, or any equivalent thereof. The ML model may be trained based on the output (e.g. the quality metrics (310)) of one or more quality components (308), an aggregated output of two or more quality components, feedback provided by one or more users (e.g. data owner), whether the dataset passes one or more quality components, and/or or other information. The machine learning model may be trained using different training techniques, such as supervised training, unsupervised training, semi-supervised training back propagation, transfer learning, stochastic gradient descent, learning rate decay, dropout, max pooling, batch normalization, and/or any equivalent deep learning technique.

In an exemplary embodiment, the orchestrator 306 may be configured to combine/aggregate two or more quality components 308 together. For example, the orchestrator 306 may chain two or more quality components 308 together. The chaining may include providing the output of one quality component 308 as an input to another quality component 308 in, for example, a serial configuration. In an exemplary embodiment, the orchestrator 306 may be additionally or alternatively configured to combine two or more quality components 308 together in a parallel configuration such that the two or more respective outputs are aggregated together to form an aggregated output. The processing by quality components 308 may be performed concurrently/simultaneously, but is not limited thereto. For example, the processing may be staggered such that the processing by one quality component is performed at a different time than one or more other quality components. In some aspects, the processing operations for two or more quality components may be partially concurrent/simultaneous (e.g. a portion of the time one component is processing at least partially overlaps with the time another component is processing).

The combination of two or more quality components 308 may include determining the mean, median, mode, and/or other statistical valuation of the outputs of the quality components 308 to generate an aggregated output of two or more quality components 308. In an exemplary embodiment, the combining (e.g. chaining and/or parallel configurations) of the quality components 308 may be externally controlled through access to the data quality system via a software development kit (SDK).

The quality component(s) 308 may abstract technology choices of downstream components such that knowledge of the downstream component may remain unknown to the implementor of the system. Although the quality components 308 may be configured with different quality configurations 332, the quality components 308 may be configured at the same time. Quality components 308 may include service chain metadata as it pertains to data quality, and process and scheduling criteria. The quality components 308 may be implemented as software components, container images, and/or serverless functions (in a cloud-computing environment) that are executed, for example, by processor 203.

In an exemplary embodiment, the quality components 308 may be configured to scale up and/or down based on the computation demand, and to process inputs, as files or streaming data, and to generate a data quality output (e.g. quality metric), which may include job status information and/or associated metadata. The quality component(s) 308 may interact with the Orchestrator 306, via one or more communication protocols, such as via HTTP/s protocol. The quality components 308 may respond (e.g. asynchronously) with the completion of their respective tasks, including writing to the quality database (metrics repository).

At operation 308, the quality component(s), having been configured by the orchestrator (at operation 306) based on the quality configurations (provided at operation 332), may process the received dataset to generate one or more quality metrics which are provided (e.g. written) to quality database 312 at operation 310. The quality database 312 (e.g. database 221) may be configured to store the quality metrics 310 to function as a metric repository. The quality metrics may be stored so as to be associated/linked with the corresponding dataset and/or with one or more quality components 308. That is, the quality metrics may include information that identifies the dataset and/or quality component(s) associated with the quality metric. This identification information may alternatively be stored as separate metadata. The database 312 may additionally store the received datasets and/or identification metadata, or the datasets and/or metadata may alternatively be stored in another local and/or external database.

At operation 314, the data quality of the dataset may be determined. That is, a computing device may determine whether the dataset has sufficient data quality (as represented by the quality metric(s)). For example, the computing device may determine whether the dataset is of sufficient quality to pass the quality component(s) 308. In an exemplary embodiment, the quality metric(s) determined for the dataset may be compared to a quality threshold.

If the quality metric is greater than the quality threshold value (YES at operation 314), the dataset may be determined to be of sufficient quality and the process 300 transitions to operation 316. At operation 316, the dataset may be made available for downstream use (e.g. by one or more downstream processors).

After operation 316, the process 300 transitions to operation 318, where a report of the dataset may be generated and made available for downstream use. The dataset and/or report may then be passed to dataset listener 320, which may be configured to facilitate access to the dataset and/or report.

Returning to operation 314, if the quality metric is less than or equal to the quality threshold value (NO at operation 314), the process 300 transitions to operation 322 and/or operation 326. At operation 322, a notification may be generated and/or provided to one or more users associated with the dataset, such as the producers of the dataset and/or the consumer(s) of the dataset. In an exemplary embodiment, the notification may be generated based on lineage data 324 that identifies the originating source of the dataset and/or which entity is responsible to address issues or defects with the dataset that are affecting its quality. In one or more aspects, the lineage data 324 may identify component processors as defined within the system (e.g. by the orchestrator) and/or with externally configured sources. The lineage data 324 may be stored in the quality database 312 and/or in one or more other internal and/or external memory units. The lineage data 324 may advantageously provide additional insight into the source(s) of the dataset and/or may be used to improve the dataset(s) at the data source. In an exemplary embodiment, the orchestrator 306 and/or one or more other processors may be configured to update or otherwise modify the lineage data 324. The modifications may be based on the quality determination(s) and/or other information.

At operation 326, another notification may be generated and/or provided to the owner of the dataset. In some aspects, the owner of the dataset may also be the producer of the dataset, but is not limited thereto. In an exemplary embodiment, based on the notification, the data owner may modify one or more quality configurations 332 via, for example, input/output device 209. For example, the data owner may be made aware of an error in the previously-used quality configuration that resulted in the failed quality determination, and may take steps to correct the quality configuration(s) to improve the quality and accuracy of a subsequent quality determination using quality component(s) configured based on the corrected/revised quality configuration(s).

In an exemplary embodiment, at operation 330, the data owner may acknowledge or reject one or more quality metrics stored in the quality database 312. For example, based on the notification (at 326) received by the data owner, the data owner may reject one or more quality metrics that, for example, were determined based on an incorrectly prepared quality configuration.

At operation 328, the system may be accessed by one or more external devices, which may include access to the information stored therein. In an exemplary embodiment, the quality database 312 may be accessed from an external device (e.g. via an Application Programming Interface (API)), which allows the quality metrics stored therein to be searched, queried, or otherwise accessed. Additionally, or alternatively, the reports 318 stored in the quality database 312 may be accessed (e.g. via the API).

Figure 5:
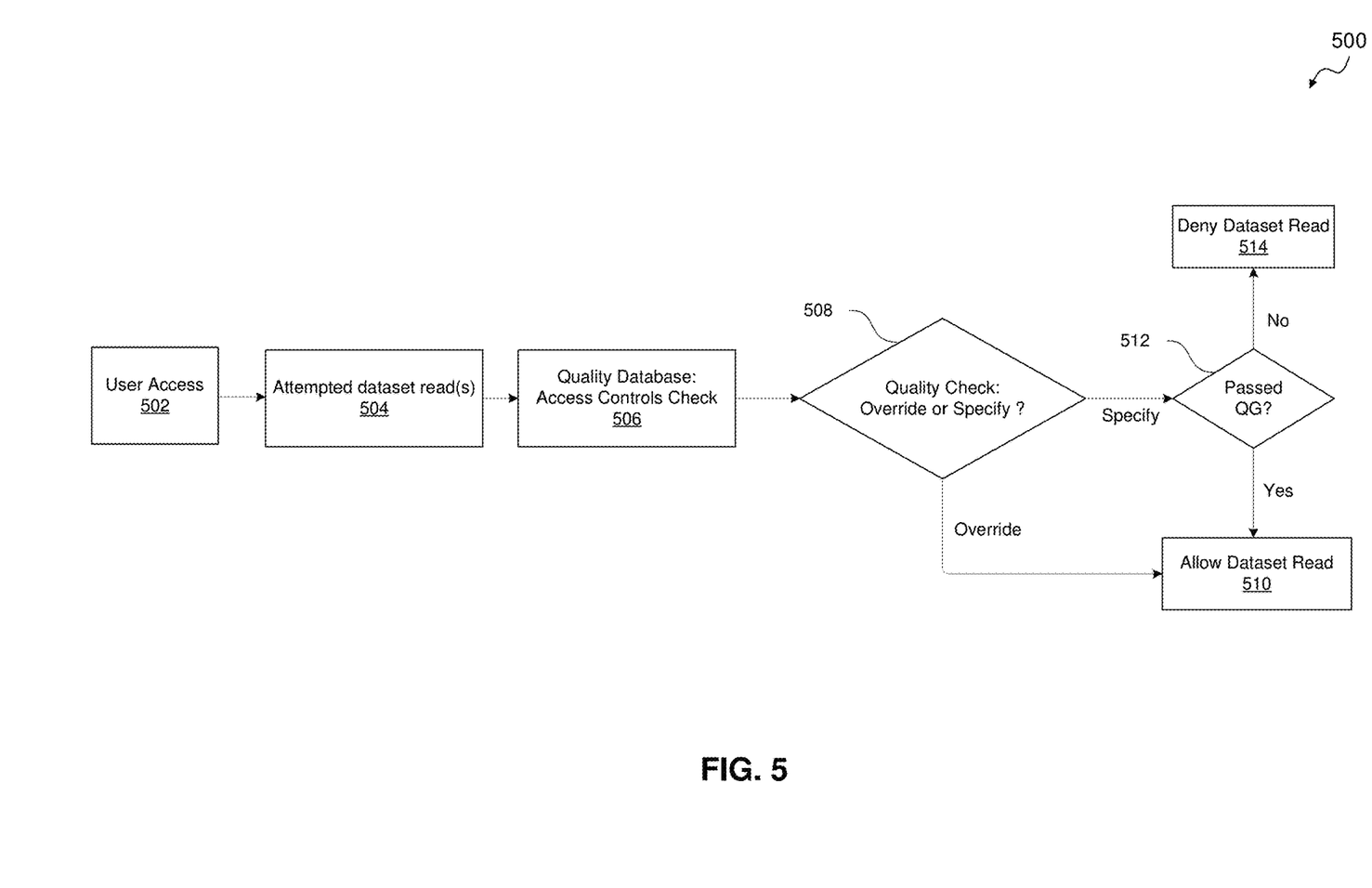
FIG. 5 shows a flow chart of a process for accessing a dataset according to one or more aspects of the disclosure.

In an exemplary embodiment, the datasets provided to the system (at operation 302), and/or the datasets processed by the system, including datasets stored in database 312 and/or in one or more other internal and/or external databases, may be accessed externally using, for example, a software development kit (SDK) which is illustrated in more detail in FIG. 5.

Figure 4:
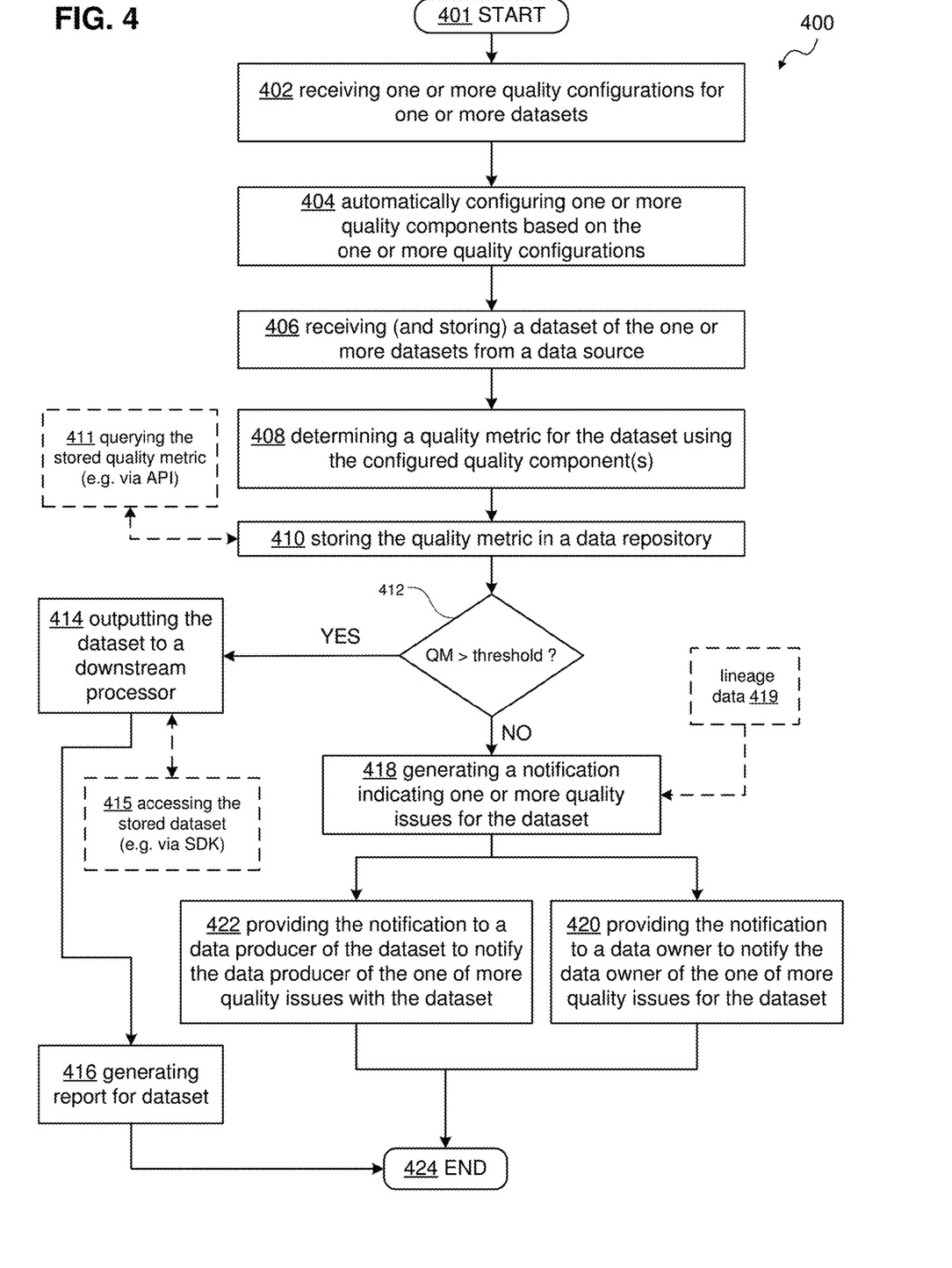
FIG. 4 shows a flow chart of a process for determining data quality according to one or more aspects of the disclosure.

Turning to FIG. 4, quality metrics defining a data quality may be determined based on configurable quality components that are configured using an orchestrator according to aspects of the disclosure. The orchestrator may adaptively configure the quality components based on the quality configurations. The quality metrics may then be used to control access to the corresponding dataset(s) associated with the quality metric(s). FIG. 4 shows a flow chart of a process for determining data quality according to one or more aspects of the disclosure. Some or all of the operations of process 400 may be performed using one or more computing devices as described herein. The discussion of process 400 may make references to process 300 illustrated in FIG. 3.

The process 400 begins at operation 401 and transitions to 402, where one or more quality configurations are received for one or more datasets. In an exemplary embodiment, the orchestrator receives the quality configuration(s) (e.g. from the data owner). At operation 404, one or more quality components may be automatically configured based on the one or more quality configurations. In an exemplary embodiment, the orchestrator may be configured to automatically configure the quality component(s) based on the quality configuration(s).

At operation 406, one or more datasets may be received by the orchestrator from a data source (e.g. from dataset listener 304). The received dataset may be stored in quality database 312 (e.g. database 221) and/or in other memory location(s) of memory 215. In other aspects, the dataset may be stored externally and/or provided to the orchestrator for processing.

At operation 408, quality metric(s) may be determined for the dataset(s) using the quality component(s) configured by the orchestrator. In an exemplary embodiment, the orchestrator may be configured to process the received dataset(s) to generate one or more quality metrics. At operation 410, the quality metric(s) may be stored in the quality database 312 (e.g. database 221). In an exemplary embodiment, the orchestrator may be configured to write the quality metric(s) to the quality database 213 to store the quality metric(s).

At operation 412, a quality determination may be performed for the received dataset(s) based on the quality metric(s). In an exemplary embodiment, a computing device (e.g., processor 203) may be configured to compare the quality metric(s) to one or more quality threshold values to determine whether the data quality of the dataset satisfies a data quality threshold. In one or more aspects, the orchestrator (e.g. embodied in processor 203) may be configured to perform the comparison, as discussed in greater detail above.

If the quality metric (QM) is greater than the quality threshold value (YES at operation 412), the dataset may be deemed to be of sufficient quality and the process 400 transitions to operation 414 where the dataset may be made available for downstream use. For example, the dataset may be outputted to one or more downstream processors.

After operation 414, the process 400 transitions to operation 416, where a report of the dataset may be generated and made available for downstream use. In an exemplary embodiment, the dataset and/or report may be passed to dataset listener 320, which is configured to facilitate access to the dataset and/or report. After operation 416, the process 400 transitions to operation 424, where the process 400 ends. The process 400 may be repeated for further processing of the dataset and/or for processing of one or more other datasets.

Returning to operation 412, if the quality metric is less than or equal to the quality threshold value (NO at operation 412), the process 400 transitions to operation 418, where a notification may be generated (e.g. by processor 203). The notification may indicate one or more quality issues or defects for the dataset, and/or or other information related to or associated with the dataset, the quality metric, and/or quality configuration.

In an exemplary embodiment, the notification may be generated based on (or include) lineage data provided at operation 419. The lineage data may identify the originating source of the dataset and/or which entity is responsible to address issues or defects with the dataset that are affecting its quality. In one or more aspects, the lineage data may identify component processors as defined within the system (e.g. by the orchestrator) and/or with externally configured sources. The lineage data may be stored in the quality database (e.g. database 221) and/or in one or more other internal and/or external memory units. In an exemplary embodiment, the orchestrator and/or one or more other processors may be configured to update or otherwise modify the lineage data. The modifications may be based on the quality determination(s) and/or other information. After operation 418, the process 400 transitions to operation 420 and/or operation 422.

At operation 420, the notification may be provided to one or more users associated with the dataset, such as the owner of the dataset. In an exemplary embodiment, the computing device (e.g., processor 203) may be configured to generate the notification(s) and/or provide the notification(s), for example, using the I/O device 209 and/or communication interface 211. In an exemplary embodiment, the data owner may modify one or more quality configurations via, for example, I/O device 209. For example, the data owner may be made aware of an error or defect in the previously-used quality configuration that resulted in, for example, a failed quality determination (e.g. based on the received notification), and may take steps to correct the quality configuration(s) to improve the quality and accuracy of a subsequent quality determination using quality component(s) configured based on the corrected/revised quality configuration(s).

At operation 422, the notification may be provided to one or more users associated with the dataset, such as the producers of the dataset and/or the consumer(s) of the dataset. In some aspects, the owner of the dataset is also the producer of the dataset, but is not limited thereto. After operations 420 and 422, the process 400 transitions to operation 424, where the process 400 ends. The process 400 may be repeated for further processing of the dataset and/or for processing of one or more other datasets.

With reference to operation 410, at operation 411, the system may be accessed by one or more external devices, which includes access to the information stored therein. In an exemplary embodiment, the quality database may be accessed from an external device (e.g. via an API), which allows the quality metrics stored therein to be searched, queried, or otherwise accessed. Additionally, or alternatively, the reports stored in the quality database 312 may be accessed (e.g. via the API). With reference to operation 414, at operation 415, the dataset(s) may be accessed externally using an SDK, which is illustrated in more detail in FIG. 5.

Access to the datasets may be controlled based on the data quality determinations as illustrated in FIGS. 3-4. With the controlled access, the reading of the stored datasets and/or the outputs (e.g. quality metrics) of the quality components, which are stored in the quality database, is selectively obscured. This allows/denies further transport of data to downstream systems. The access may be controlled based on one or more parameters of the quality configurations, configurations of the quality components, and/or other data/information as would be understood by one of ordinary skill in the arts. FIG. 5 shows a flow chart of a process for accessing a dataset according to one or more aspects of the disclosure. Some or all of the operations of process 500 may be performed using one or more computing devices as described herein.

The process 500 begins at operation 502, where external access may be attempted by one or more users and/or devices. The access request may be made using an SDK. In other aspects, the access request may be made using an API. At operation 504, one or more read attempts for the dataset(s) may be made by the external user and/or device. At operation 506, an access control check may be performed to initiate a determination of whether access to the dataset(s) should be granted. A computing device (e.g., processor 203) may be configured to perform the access control check based on a request received (e.g. via the SDK) by the external user and/or device.

At operation 508, the computing device may determine whether an override of the quality check should be granted. If the override is granted, the process 500 transitions to operation 510, where access to the dataset may be permitted to allow the dataset(s) to be read by the external user and/or device. If the override is not granted, the process 500 transitions to operation 512 where a determination of whether to grant access is based on whether the dataset has passed the data quality determination.

If the dataset(s) passed the data quality determinations (i.e. the quality metric(s) are greater than the quality threshold value(s)), access to the dataset(s) may be granted and the process 500 transitions to operation 510, where access to the dataset may be permitted to allow the dataset(s) to be read by the external user and/or device. If the dataset(s) fails the data quality determinations (i.e. the quality metric(s) are less than or equal to the quality threshold value(s)), access to the dataset(s) may be denied and the process 500 transitions to operation 514, where the dataset(s) is not allowed to be read by the external user and/or device.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   automatically configuring, by an orchestrator of a data processing pipeline, one or more quality components based on one or more quality configurations for one or more datasets;
   determining, using the configured one or more quality components, a quality metric for a first dataset of the one or more datasets associated with a first stage of the data processing pipeline;
   determining whether the quality metric satisfies one or more parameters of the one or more quality configurations; and
   upon determining that the quality metric satisfies the one or more parameters, outputting the first dataset to a downstream processor, wherein the downstream processor is associated with a second stage of the data processing pipeline.

2. The computer-implemented method of claim 1, wherein the quality metric for the first dataset is determined prior to advancing the first dataset to the second stage of the data processing pipeline.

3. The computer-implemented method of claim 1, wherein the one or more parameters comprise one or more quality thresholds for the one or more datasets.

4. The computer-implemented method of claim 1, further comprising receiving, by the orchestrator from a data source, the first dataset, wherein the data source is associated with the first stage of the data processing pipeline.

5. The computer-implemented method of claim 1, further comprising:
   receiving, by the orchestrator, a second dataset;
   determining, using the configured one or more quality components, a second quality metric for the second dataset; and
   upon determining that the second quality metric does not satisfy the one or more parameters, generating a notification indicating one or more quality issues for the second dataset.

6. The computer-implemented method of claim 5, further comprising providing the notification to a data owner to notify the data owner of the one or more quality issues for the second dataset.

7. The computer-implemented method of claim 5, further comprising providing the notification to a data producer of the first dataset to notify the data producer of the one or more quality issues with the second dataset.

8. The computer-implemented method of claim 7, wherein the notification is generated using lineage data that identifies at least one of:
   an originator of the second dataset; or
   one or more upstream processors having processed the second dataset.

9. The computer-implemented method of claim 1, wherein the orchestrator is configured to reconfigure the one or more quality components based on one or more new quality configurations received by the orchestrator.

10. The computer-implemented method of claim 1, wherein the configuring by the orchestrator comprises chaining two quality components of the one or more quality components together, wherein the quality metric is determined based on the two chained quality components.

11. The computer-implemented method of claim 1, further comprising storing the quality metric in a data repository.

12. The computer-implemented method of claim 11, further comprising querying the stored quality metric using an Application Programming Interface (API) configured to access the data repository.

13. The computer-implemented method of claim 1, further comprising accessing the first dataset using a software development kit (SDK) based on the quality metric and the one or more parameters.

14. The computer-implemented method of claim 1, further comprising updating, using a machine learning algorithm, the one or more quality configurations, wherein the machine learning algorithm is trained based on the determination whether the quality metric satisfies the one or more parameters.

15. The computer-implemented method of claim 1, further comprising updating the one or more quality configurations based on a received update request.

16. A computing device comprising:
   one or more processors; and
   memory storing instructions that, when executed by the one or more processors, configure the computing device to:
      automatically configure one or more quality components based on one or more quality configurations for one or more datasets received from a data source;
      determine, using the configured one or more quality components, a quality metric for a first dataset of the one or more datasets associated with a first stage of a data processing pipeline prior to advancing the first dataset to a second stage of the data processing pipeline;
      determine whether the quality metric satisfies one or more parameters of the one or more quality configurations;
      based on a determination that the quality metric satisfies the one or more parameters, output the first dataset to a downstream processor associated with the second stage of the data processing pipeline; and
      based on a determination that the quality metric does not satisfy the one or more parameters, generating a notification indicating one or more quality issues for the first dataset.

17. The computing device of claim 16, wherein the quality metric is for one or more data records and/or metadata contained in the first dataset.

18. The computing device of claim 16, wherein the instructions, when executed by the one or more processors, configure the computing device to aggregate outputs of two quality components, of the one or more quality components, to determine the quality metric.

19. The computing device of claim 16, wherein the downstream processor is adapted to generate a report indicating the quality metric of the first dataset.

20. One or more non-transitory media storing instructions that, when executed, cause a computing device to:
- automatically configure, by an orchestrator of a data processing pipeline, one or more quality components based on one or more quality configurations for one or more datasets;
- determine, using the configured one or more quality components, a quality metric for a first dataset of the one or more datasets associated with a first stage of the data processing pipeline; and
- output, based on the quality metric and one or more parameters of the one or more quality configurations, the first dataset to a downstream processor, wherein the downstream processor is associated with a second stage of the data processing pipeline.

* * * * *